SOLID-STATE HORIZONTAL SWEEP DRIVING CIRCUIT
Filed July 29, 1968
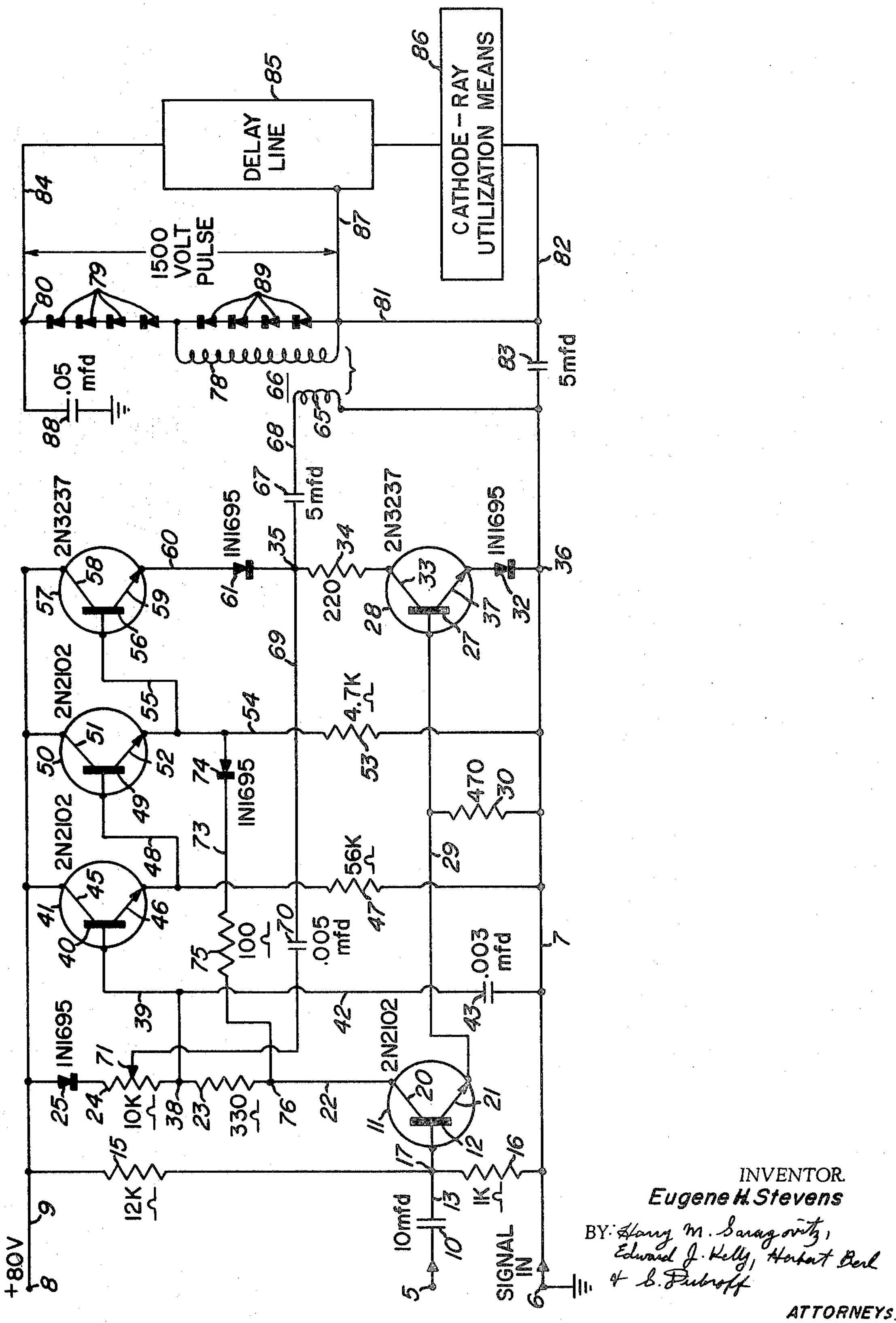
INVENTOR
Eugene H. Stevens
BY Harry M. Saragovitz, Edward J. Kelly, Herbert Berl & S. Dubroff
ATTORNEYS 3,539,837

SOLID-STATE HORIZONTAL SWEEP DRIVING CIRCUIT

Eugene H. Stevens, Newbury Park, Calif., assignor, by mesne assignments, to the United States of America as represented by the Secretary of the Army Filed July 29, 1968, Ser. No. 748,467
Int. Cl. H03k 3/26
U.S. Cl. 307—270 6 Claims

ABSTRACT OF THE DISCLOSURE

A transformer-transistor combination or network for driving a horizontal delay line for a cathode-ray tube circuit or the like. A minimum number of transistor devices, all of the same NPN type, are connected in a three-stage circuit configuration with emitter-follower coupling between stages. Between the output stage and the utilization circuit coupling is provided a step-up transformer feeding into a delay line. An input stage consisting of one transistor with feed back from two of the other stages is coupled by emitter-follower coupling to a control transistor stage in series with the output stage and normally bias off.

A bleeder resistor circuit is provided between a positive supply lead for the transistor circuits and the negative supply lead, with a resistor section in the impact circuit for biasing off the input transistor until a negative square-wave signal is received, such as a negative square-wave horizontal synchronizing pulse in a cathode-ray tube system for example.

The invention described herein may be manufactured, used, and licensed by or for the Government for governmental purposes without the payment to me of any royalty thereon.

A high-current 80-volt pulse is delivered by the network through a step-up 40-to-1 ratio output transformer which produces a 1500 volt negative pulse. This pulse is caused to travel down the delay line to utilization means such as the deflecting plates of cathode ray system. The circuit or network operates to shape the pulse and deliver a high momentary current through the step-up output transformer, and has sufficient overlap or slope to give the electronic beam, in a flat cathode ray tube, a linear horizontal movement across the screen.

The present invention relates to horizontal-sweep driving or circuit networks, and the like, for cathode-ray tubes, such as flat cathode ray tubes for example, and has for its primary object to provide an improved circuit of this type which embodies all transistor devices, that is, is of the solid-state type throughout; and which is adapted to receive a horizontal synchronizing pulse and to so amplify and shape it that it may be used to send a relatively high voltage pulse down a delay line with sufficient overlap or slope to give the electronic beam in a flat cathode-ray tube a linear horizontal movement across the screen. This has not been accomplished heretofore with any degree of success using transistors.

The circuit of the present invention further is adapted to provide a high-voltage negative pulse which may be applied to move along a delay line supplying the successive deflecting plates with sweep voltages, and which may be derived from a negative square-wave horizontal synchronizing pulse fed into the opposite end of the circuit or network. The high-current 80-volt pulse feed out of the network is passed through a 40-to-1 ratio transformer before it is applied to the delay line and the utilization means. Previous circuits of this type have customarily used vacuum tubes as electronic control elements therein. Considerable difficulty may be encountered during the use of such circuits because of tube failure when used for driving the horizontal sweep circuits of cathode-ray apparatus. The resultant circuit provides a solid-state horizontal drive circuit with a transformer-transistor combination that effectively drives a horizontal delay line while entirely eliminating the difficulties of tube-type horizontal drive circuits.

The invention will further be understood from the following description when considered with reference to the accompanying drawing, and its scope is pointed out in the appended claims.

In the drawing, the single figure is a schematic circuit diagram of solid-state horizontal-sweep driving circuit embodying the invention, and referring thereto, 5 and 6 are input terminals for a signal such as a synchronizing signal to be applied to the circuit. The terminal 6 is connected to system ground as indicated and also to a system ground lead 7. A positive terminal 8 for operating current is provided and connected to a positive supply lead 9 for the system.

The high-potential signal input terminal 5 is coupled through an input coupling capacitor 10 to an input transistor 11 and the base 12 thereof through an input circuit lead 13. A bleeder resistor network comprising a resistor 15 and a resistor 16 are connected serially between the leads 9 and 7 with an intermedaite terminal 17 between the resistors for the lead 13 and the input circuit. The resistor valves are such that a positive bias is placed on the base 12 to cut the transistor 11 off during normal operation without signal input.

The transistor 11 is provided with a collector 20 and an emitted 21. The collector 20 is connected through a collector circuit or circuit lead 22 with the positive lead 9 through a pair of coupling resistors 23 and 24 in series and a diode 25 poled for conduction from the positive lead 9 through the resistors 24 and 23 to the collector 20.

The emitter 21 is coupled to the base 27 of a control transistor 28 through a coupling circuit 29 across an emitter coupling resistor 30 connected between the lead 29 and the system ground of the lead 7. The emitter 37 of the control transistor 28 is connected also to system ground or the lead 7 through a diode 32 poled for conduction from the emitter to ground as indicated. The control transistor 28 is also provided with a collector 33 which is connected through a resistor 34 with one output terminal 35 for the three-stage amplifier circuit, of which the other is the common ground circuit 7 at a terminal indicated at 36 in common with the diode 32 connection.

At a terminal 38 between the resistors 23 and 24, a lead 39 is connected to the base 40 of a first-stage amplifier transistor 41 and also through a lead 42 and a timing capacitor 43 to the ground lead 7. The rectifier 25, the resistor 24 and the capacitor 43 provides a timing or pulse generating circuit through the lead 42, as will hereinafter be described.

The first-stage amplifier or transistor 41 is provided with a collector 45 connected to the positive supply lead 9 and with an emitter 46 connected to the ground lead 7 through an emitter coupling resistor 47 and through a lead 48 to input or base electrode 49 of the second-stage transistor 50. The latter is provided with a collector 51 connected to the supply lead 9 and with an emitter 52 connected through an emitter resistor 53 and circuit lead 54 to the negative supply lead or ground 7. It is also coupled through lead 55 with the input or base electrode 56 of the third-stage coupling transistor 57.

The transistor 57 is provided with an output or collector electrode 58 which is connected to the supply lead 9, and with an emitter 59 which is connected through an emitter circuit 60 with the output terminal 35. A diode 61 is included in the circuit 60 between the emitter 59 and the terminal 35 to insure current flow in a direction from the emitter to the terminal 35.

The resistor 34 is effectively in the emitter circuit 60 as the emitter coupling resistor and the amplifier output coupling-impedance for the output circuit at the terminal 35. To this output terminal the primary winding 65 of a step-up output transformer 66 is connected through an output circuit 68 and a coupling capacitor 67 therein, with return to system ground 7. It will be noted that a feedback circuit 69 is provided from the terminal 35 through a feedback capacitor 70 to a movable tap 71 on the resistor 24. The latter effectively is in the collector circuit of the input stage transistor 11 coupled to the input base electrode 40 of the first stage 41. Also, a feedback circuit connection is provided to a terminal 76 on the emitter circuit 22 from the emitter circuit 54 through a feedback circuit lead 73 in which is located a series diode 74 and a series controlling resistor 75.

It will thus be seen that a three-stage solid-state amplifier is provided in which all of the amplifier elements are transistor devices of the same NPN type thereby simplifying the circuitry and the component supply thereof. For the present system, the transistors 11, 41 and 50 may be of the commercial 2N2162 type and the transistors 57 and 28 may be of the commercial 2N3237 type, by way of example. The transistors are all emitter-follower coupled from one stage to the next, and, from the output stage at the terminal 35, to the output device or coupling transformer 66. On the input side, from the input amplifier stage 11 coupling is provided directly to control transistor stage 28 and indirectly to the first input stage 41, whereby the amplifier system normally cutoff, is put into operation in response to an input signal pulse such as a negative square-wave synchronizing pulse at the terminals 5 and 6.

On the output end of the circuit or network, the transformer 66 is provided with a secondary winding 78 coupled to the primary winding 65 and connected through a series of rectifier devices 79, preferably of the commercial IN2071 type, to a terminal 80 on the high side, and on the low side through a lead 81 to an output lead 82, and to system ground or the lead 7 through a coupling capacitor 83. The stepped-up signal output from the terminal 80 is taken through an output lead 84 and a delay line 85 to utilization means 86, the delay line being connected back to the lead 81 and ground through the lead 87. A series of rectifier devices of the commercial IN2071 type rectifier devices 79, are provided across the secondary 78 as indicated at 89, and the terminal 80 is provided with a stabilizing capacitor 88 connected to ground, as indicated.

The operation of the circuit network or system is as follows:

With the circuit or system energized from the terminals 8 and 6 through the supply leads 9 and 7, a synchronizing pulse or other signal input at the terminals 5 and 6 is applied through the coupling capacitor 10 to the base 12 of the input stage 11. If, as is normal, this input signal pulse is a negative-going pulse the transistor 11 is turned on. As hereinbefore mentioned, the resistor elements 15 and 16 are setup to base-bias the transistor 11 so that when there is no input pulse received at the terminals 5 and 6, the transistor is in the OFF condition.

The emitter 21 of the input transistor 11 is connected across the impedence of the coupling resistor 30 to the base 27 of the control transistor 28 so that when the transistor 11 conducts it also turns on the transisor 28 which uses the resistor 30 for the base bias. The collector 20 of the input transistor 11 is connected to the base 40 of the first-stage transistor 41 through the resistor 23 and the lead 39. The latter is also connected to a pulse-forming or generating circuit consisting of the resistor 24, the capacitor 43 and the diode 25. With the input stage 11 turned on, current flows through the resistors 24 and 23 thence through the collector-emitter path and the resistor 30 to the ground return 7. This removes the positive bias from the input or base electrode 40 of the first stage 41 which, with the transistor 11 off or open, remains at collector potential as will be seen from the circuit. Also the timing capacitor 43 is charged through the diode 25 and the resistor 24 of the potential of the lead 9. The capacitor then discharges through resistor 23 and the emitter-collector path of the input stage 11 to apply a pulse to the input base 40 of the first stage 41. The pulse on the base of the first stage 41 is then transferred to the base 49 of the second stage transistor 50, which is an emitter follower through the lead 48 using the resistor 47 as the emitter resistor or coupling impedance. The pulse is then passed in a similar manner through the lead 53 from the resistor 54 and applied to the base 56 of the third-stage transistor 57 which uses the resistor 34 as the emitter resistor and output coupling impedance means, and drives the output transformer primary winding 65 as hereinbefore indicated.

The transistors 57 and 28 operate together, with the transistor 28 holding the transistor 57 in the OFF condition until a synchronizing pulse or input signal is received at the terminals 5 and 6 to start the amplifier into active operation. The capacitor 67 is used to couple the output signal or signal pulse into the transformer 66 for the step-up to an effectively high voltage, such as 1500 volts in the present example, on the output side of the transformer.

The negative square-wave horizontal synchronizing pulse or signal which is applied to the input terminals 5 and 6, results in a high-current 80-volt pulse being fed out of the network or circuit at the terminal 35 through the 40-to-1 ratio transformer 66. This produces the 1500 volt negative pulse which is required to traverse the delay line 85, which in the present example may be set for a delay of 63 microseconds, and supply any suitable output or utilization device such as the reflecting plates of a cathode ray system (not shown) with deflecting voltages as the pulse moves down the delay line. This system utilizes a total of five transistors, all of the same type, and a simplified circuit providing a high momentary output current adapted to be translated through low-impedance transformer. This has resulted in an improved solid-state horizontal-sweep driving circuit entirely eliminating the need for vacuum tubes, and the added circuit network required therefor. It has been found that this circuit is particularly adapted for use with flat cathode-ray type tubes having a linear horizontal beam movement across the screen, although it is adapted for other similar uses.

What is claimed is:

1. A horizontal sweep driving circuit network for cathode-ray tube circuits and the like, comprising in combination, a multi-stage solid-state amplifier, each stage having emitter and collector circuits connected therewith, means providing emitter-follower interstage coupling and emitter-follower output coupling therefor, means providing a signal output circuit having output terminals for said amplifier, a delay line, an output transformer of the step-up type, said transformer being coupled between said output circuit and said delay line, a control transistor having a base electrode and having the collector-emitter path thereof in series relation with the emitter circuit of the output amplifier stage for the control thereof, an input amplifier stage including a transistor having emitter and collector elements and a base electrode, a signal input circuit for said network connected with said base electrode and including a bias resistor therefor, a bleeder-resistor circuit including said bias resistor for applying a positive cutoff bias to the said base electrode, means providing an emitter-follower coupling circuit for said input amplifier stage with the base electrode of the control transistor for triggering said control transistor for conduction in response to an applied signal on said input circuit, means including a timing capacitor resistance coupled in the collector circuit of the input amplifier stage providing a timing circuit for operation in response to turning on of said input amplifier stage, and means providing feedback circuit coupling between the emitter circuit of one amplifier stage with the collector circuit of the input amplifier stage.

2. A horizontal sweep driving circuit for cathode-ray tube circuits and the like, as defined in claim 1, wherein each amplifier stage includes a transistor of the NPN type connected for base input, and wherein the output transformer is of a high step-up type providing a voltage step-up of at least 40:1 from primary to the secondary winding, thereby to provide a high voltage output for application to and through said delay line.

3. A horizontal sweep driving circuit network comprising in combination, a solid-state amplifier having a first stage and intermediate and output stages, means providing emitter-follower interstage signal-translating coupling and emitter-follower signal output coupling for said amplifier at the output stage thereof, a signal output transformer of the step-up type connected with the output coupling means for said amplifier and comprising a primary winding and a secondary winding, a delay line, utilization means for said network connected with said secondary winding throughout said delay line, a control transistor having a collector-emitter path in series relation with the collector-emitter path of said output amplifier stage for control thereof and having an input base electrode, an input amplifier stage including a transistor having base electrode and emitter and collector elements, amplifier input terminals coupled with the transistor base electrode of the input amplifier stage and system ground for said amplifier, bleeder-resistor means for applying a positive cutoff bias to the base electrode of said input stage transistor, means providing an emitter circuit for the input stage transistor connected to the base electrode of the control transistor and including an emitter resistor, a timing capacitor for said network, means providing a collector circuit for said input stage transistor including a pair of series-connected resistors having an intermediate terminal therebetween, said last-named terminal being coupled to the first amplifier stage and to system ground through said timing capacitor whereby one of said resistors and said capacitor provide a timing circuit for operation in response to turning on of said input amplifier stage transistor, and means providing feed-back circuit connections between the intermediate and output stages of said amplifier and the collector circuit of the input stage transistor from the emitter-follower interstage and output coupling.

4. A horizontal sweep driving circuit network for cathode-ray tube circuits and the like, comprising in combination, a three-stage solid-stage amplifier having an input circuit and an output circuit, each stage including a transistor amplifier device having as base, emitter and collector and having emitter and collector circuits connected therewith, means providing emitter-follower interstage coupling between the first and second stages thereof and emitter-follower signal-pulse output coupling between the third stage thereof and said output circuit, an output transformer coupled to said output circuit and having a step-up ratio providing a high-voltage output utilization with cathode-ray tube devices and the like, a control transistor having a base electrode and having the collector-emitter path thereof in series relation with the emitter circuit of the output amplifier stage for control thereof, a signal input amplifier stage including a transistor having emitter and collector elements and having a base electrode, a signal input circuit for said network, said input circuit including an input coupling resistor connected with the base electrode of the input amplifier stage transistor, a bleeder-resistor circuit including said input coupling resistor for applying a positive cutoff bias to the said base electrode of the input amplifier stage, means providing an emitter-follower coupling circuit for said input amplifier stage with the base electrode of the control transistor for triggering said control transistor for conduction in response to an applied signal pulse on said input circuit, a timing capacitor resistance coupled in the collector circuit of the input amplifier stage to provide a timing circuit for operation in response to turning on of said input amplifier stage, and means providing feedback circuit coupling between the emitter circuits of one amplifier stage with the collector circuit of the input amplifier stage.

5. A horizontal sweep driving circuit network for cathode-ray tubes and the like, comprising in combination, a multi-stage transistor amplifier each stage including a transistor amplifier device having a base electrode and at least an emitter and a collector electrode, means providing emitter and collector circuits for each amplifier stage and emitter-follower interstage coupling therebetween an emitter-follower signal output coupling circuit for said amplifier including an emitter circuit resistor, a control transistor device having a base electrode and the emitter collector path thereof in series with said emitter circuit resistor for controlling the operation thereof, a negative square-wave signal input amplifier stage including a transistor device having emitter, collector and base electrodes, means providing collector circuit coupling between said signal input amplifier stage and the first stage of said multistage amplifier, means providing emitter follower coupling between said signal input amplifier stage and the control transistor base electrode, and a step-up output transformer having a high voltage output secondary winding and a primary winding connected with said output coupling circuit across said emitter circuit resistor as a coupling impedance.

6. A horizontal sweep driving circuit network as defined in claim 5, wherein said transistor devices are all of the same NPN type connected for base input and wherein a timing capacitor is included in the collector circuit coupling of the signal input amplifier stage with the first stage of the multi-stage amplifier.

References Cited

UNITED STATES PATENTS

| | | | |
|---|---|---|---|
| 3,178,593 | 4/1965 | Diehl | 315—27 X |
| 3,440,440 | 4/1969 | Prohofsky et al. | 307—270 X |

DONALD D. FORRER, Primary Examiner

R. C. WOODBRIDGE, Assistant Examiner

U.S. Cl. X.R.

307—228; 315—27; 328—182